(12) United States Patent
Tanoue et al.

(10) Patent No.: US 11,547,119 B2
(45) Date of Patent: Jan. 10, 2023

(54) PLANT GROWTH PROMOTER

(71) Applicant: Kao Corporation, Tokyo (JP)

(72) Inventors: Akihiro Tanoue, Wakayama (JP); Yuji Maruno, Wakayama (JP)

(73) Assignee: Kao Corporation, Tokyo (JP)

( * ) Notice: Subject to any disclaimer, the term of this patent is extended or adjusted under 35 U.S.C. 154(b) by 89 days.

(21) Appl. No.: 16/651,552

(22) PCT Filed: Oct. 16, 2018

(86) PCT No.: PCT/JP2018/038519
§ 371 (c)(1),
(2) Date: Mar. 27, 2020

(87) PCT Pub. No.: WO2019/078209
PCT Pub. Date: Apr. 25, 2019

(65) Prior Publication Data
US 2020/0275667 A1    Sep. 3, 2020

(30) Foreign Application Priority Data

Oct. 17, 2017 (JP) .............................. JP2017-200921

(51) Int. Cl.
*A01N 25/12* (2006.01)
*A01N 65/08* (2009.01)
*A01N 65/20* (2009.01)
*A01N 65/34* (2009.01)
*A01N 65/40* (2009.01)
*A01C 21/00* (2006.01)
*C09K 17/32* (2006.01)
*C05F 5/00* (2006.01)

(52) U.S. Cl.
CPC .............. *A01N 65/20* (2013.01); *A01C 21/00* (2013.01); *A01N 25/12* (2013.01); *A01N 65/08* (2013.01); *A01N 65/34* (2013.01); *A01N 65/40* (2013.01); *C05F 5/002* (2013.01); *C09K 17/32* (2013.01)

(58) Field of Classification Search
None
See application file for complete search history.

(56) References Cited

U.S. PATENT DOCUMENTS

| | | | |
|---|---|---|---|
| 2010/0216639 A1 | 8/2010 | Hubbs | |
| 2020/0045983 A1 | 2/2020 | Tsuno et al. | |

FOREIGN PATENT DOCUMENTS

| | | |
|---|---|---|
| CN | 102515957 A | 6/2012 |
| CN | 103012011 A | 4/2013 |
| CN | 103304283 A | 9/2013 |
| CN | 104479715 A | 4/2015 |
| CN | 104589890 A | 5/2015 |
| CN | 105399582 A | 3/2016 |
| CN | 105918364 A | 9/2016 |
| CN | 106748051 A | 5/2017 |
| CN | 106866224 A | 6/2017 |
| CN | 107082688 A | 8/2017 |
| CN | 107197883 A | 9/2017 |
| EP | 0 952 201 A1 | 10/1999 |
| JP | 61-289820 A | 12/1986 |
| JP | 9-302340 A | 11/1997 |
| JP | 11-50052 A | 2/1999 |
| JP | 2000-23560 A | 1/2000 |
| JP | 2003-192484 A | 7/2003 |
| JP | 2004-285033 A | 10/2004 |
| KR | 20170041954 A | 4/2017 |
| WO | WO 2018/159393 A1 | 9/2018 |

OTHER PUBLICATIONS

Fono-Tamo, R. S., and Olufemi A. Koya. "Characterisation of pulverised palm kernel shell for sustainable waste diversification." (2013).*
Hectare, Wikipedia, pp. 1-7 (Year: 1970).*
"Liaoning Traditional Chinese Medicine History—Plants", Liaoning Science and Technology Press, 2010, p. 142 (with Statement of Relevance).
Abula Neurman et al., "Effects of different varieties pollinating on fruit setting and fruit quality of *Prunus domestica* 'France'", China Academic Journal Electronic Publishing House, 2016, pp. 1453-1459 (with English abstract).
Combined Chinese Office Action arid Search Report dated Jan. 20, 2021 in Patent Application No. 201880066610.8 (with English translation of Office Action and English translation of Categories), 10 pages.
Li Chang et al, "The theory of augmented typhoid fever and apoplexy", China Medical Science Press, 2016, p. 130 (with partial English translation).
Zhang Xingdan, "Nuclear Ventilation and Air Purification", Trial Textbooks for Colleges and Universities, First Edition, Atomic Energy Press, 1993, p. 134 (with partial English translation).
International Search Report (PCT/ISA/210) issued in PCT/JP2018/038519, dated Dec. 11, 2018.
International Preliminary Report on Patentability and the English translation of the Written Opinion of the International Searching Authority, dated Apr. 30, 2020, for International Application No. PCT/JP2018/038519.

* cited by examiner

*Primary Examiner* — Alton N Pryor
(74) *Attorney, Agent, or Firm* — Element IP, PLC

(57) ABSTRACT

The present invention is a plant growth promoter containing one or more seed shell components of plant selected from Palmae Elaeis, Leguminosae Faboideae, Juglandaceae, Rosaceae Prunus, and Oleeae.

20 Claims, No Drawings

PLANT GROWTH PROMOTER

FIELD OF THE INVENTION

The present invention relates to a plant growth promoter and a method for growing a plant.

BACKGROUND OF THE INVENTION

Various nutritional factors are necessary for plant growth. A shortage of some of the factors is known to hinder plant growth. For example, three major fertilizer factors are: nitrogen which is a component element of proteins; phosphorus which is not only a constituent element of nucleic acids or phospholipids but plays an important role in energy metabolism and synthesis or decomposition reactions of substances; and potassium which has physiological action of substance metabolism or mass transfer. A shortage of these major components generally depauperates plant growth. Calcium is an important component constituting plant bodies and cells and also plays an important role in maintaining the balance of the metabolic system. Therefore, deficiency in calcium causes physiological disorders. In addition, various nutrients such as Mg, Fe, S, B, Mn, Cu, Zn, Mo, Cl, Si, and Na are necessary for plants.

These nutritional components such as nitrogen, phosphorus, and potassium are applied in the form of a base fertilizer or an additional fertilizer, or a liquid fertilizer is diluted and provided by soil drench or foliar spray. Although these fertilizers are essential for plant growth, the application of the fertilizers beyond certain concentrations cannot contribute to improvement in the growability and yields of plants.

However, an important challenge to agricultural production is to increase yields by promoting the growth of agricultural crops and increasing harvests per unit area. For this purpose, various necessary plant growth regulators have been developed and utilized. The plant growth regulators represented by gibberellin, auxin, and the like are used for regulating growth such as sprouting, rooting, elongation, flower formation, or fruit setting, and morphogenic reaction. However, these substances have multifaceted and complicated actions and limited applications.

Various techniques considered to lead to the growth promotion of agricultural crops have heretofore been proposed. In fields where agricultural crops are to be cultivated, soil properties are important factors in terms of productivity and the like, and studies are being carried out to increase productivity by improving soil properties. The use of plant-based materials at that time has also been studied.

JP-A 61-289820 describes a soil improvement agent obtained by crushing and cutting a coconut shell into irregular shapes with its epidermis and hard inner shell adhering to each other, and then sorting according to size and packaging.

JP-A 9-302340 describes a soil improvement agent mainly composed of the fibrous material of coconut rind.

JP-A 11-50052 describes a soil expansion and softening agent in which coconut shell chips and coconut shell fibers are mixed with coconut shell dust.

JP-A 2000-23560 describes at least one culture soil selected from the group consisting of coconut dust, beaten bark, and sawdust as the culture soil.

JP-A 2003-192484 describes a growth promoter for plants characterized by containing an organic substance such as a pulverized product obtained by pulverizing the mesocarp of coconut fruit or a fermented product thereof, and a neutralizing agent.

SUMMARY OF THE INVENTION

The present invention provides a plant growth promoter that does not cause phytotoxicity or the like in plants and exhibits an excellent growth promoting effect on plants such as agricultural crops.

The present invention relates to a plant growth promoter containing one or more seed shell components of plant selected from Palmae Elaeis, Leguminosae Faboideae, Juglandaceae, Rosaceae Prunus, and Oleeae (hereinafter referred to as component (a)).

The present invention includes a plant growth promoter containing palm kernel shell.

In addition, the present invention relates to a method for growing a plant, wherein the plant is cultivated in a soil containing the plant growth promoter of the present invention.

According to the present invention, there are provided a plant growth promoter, a production method thereof, and a method for growing a plant, which exhibit an excellent growth promoting effect on a plant such as an agricultural crop without causing phytotoxicity in the plant. Yield can be improved by applying the plant growth promoter of the present invention to, for example, an agricultural crop.

Embodiments of the Invention

<Plant Growth Promoter>

The plant growth promoter of the present invention contains a seed shell component of plant selected from Palmae Elaeis, Leguminosae Faboideae, Juglandaceae, Rosaceae Prunus, and Oleeae (component (a)). As component (a), one or two or more components, for example, two components can be used.

The seed shell component referred to as component (a) may be what is known as a sheath or a shell, which is the outer shell protecting the seed (ovule). The seed shell component may also include the seed component.

Examples of the seed shell component of Palmae Elaeis include the seed shell component of palm. In the present specification, the palm seed shell component is synonymous with palm kernel shell. In other words, examples of the seed shell component of Palmae Elaeis include the palm kernel shell.

Examples of the seed shell component of Leguminosae Faboideae include the seed shell component of plants such as soybean, cowpea, peanut, pea, pigeon pea, sword bean, zeocarpa bean, rattlebox, and velvet bean.

Examples of the seed shell component of Juglandaceae include the seed shell component of plants such as Japanese walnut, walnut, Japanese wingnut, Pterocarya stenoptera, Shinano walnut, Platycarya strobilacea, and pecan.

Examples of the seed shell component of Rosaceae Prunus include the seed shell component of plants such as known as stone fruits, such as Japanese apricot, peach, Japanese plum, apricot, cherry, jujube, mango, and prune.

Examples of the seed shell component of Oleeae (Sub-tribe Oleinae) include the seed shell component of plants belonging to Genus *Olea*, such as olive.

Preferable examples of component (a) include one or more components selected from palm kernel shell, peach seed shell, Japanese apricot seed shell, prune seed shell, peanut seed shell, walnut seed shell, Japanese plum seed shell, and olive seed shell.

A plant growth promoter containing palm kernel shell is a preferred embodiment of the present invention.

Palm kernel shell can be obtained as, for example, the shell remaining after extracting the oil from the fruit and the kernel of the palm. Hereinafter, the palm kernel shell is sometimes referred to as PKS.

Peach seed shell is, for example, the shell remaining after removing the fleshy portion and the seed kernel from the peach fruit.

Japanese apricot seed shell is, for example, the shell remaining after removing the fleshy portion and the seed kernel from the Japanese apricot fruit.

Prune seed shell is, for example, the shell remaining after removing the fleshy portion and seed kernel from the prune fruit.

Peanut seed shell is, for example, the shell remaining after removing the fruit (bean) from the peanut seed.

Walnut seed shell is, for example, the shell (inner endocarp) remaining after removing the fleshy portion and the seed (kernel) from the walnut accessory fruit.

Japanese plum seed shell is, for example, the shell remaining after removing the fleshy portion and the seed kernel from the Japanese plum fruit.

Olive seed shell is, for example, the shell remaining after removing the fleshy portion (including the oily part) and the seed kernel from the olive fruit.

The seed shell component of component (a) is a shell from which edible parts such as the flesh and useful parts such as fats and oils have been removed, and is generally discarded.

The present invention discovered that component (a) such as PKS modifies soil and improves the yield of plants such as agricultural crops. As shown in the comparative examples described later, improvement in plant yield due to an effect of modifying the soil was not found with other substances known as plant biomass, such as sugarcane bagasse, and the effect due to component (a) such as PKS found by the present invention is an unexpected effect for a person skilled in the art. It is inferred that the soil is modified as a result of a chemical action on the soil by component (a), for example, PKS in the promoter of the present invention.

Component (a), for example, PKS preferably contains 40% by mass or more and more preferably 45% by mass or more, and preferably 60% by mass or less and more preferably 55% by mass or less of lignin. The lignin content in the palm kernel shell is determined by the Klason lignin method. Specifically, the total lignin content is calculated as the sum of the acid-insoluble lignin ratio and the acid-soluble lignin ratio, according to the TAPPI formula analysis method T222om-83.

Because component (a), for example, PKS tends to be more compatible with the soil when formed as a granular material by pulverization or the like than when supplied to the soil as it is (uncrushed), it is inferred that it contributes to healthier growth of the plant by modifying the soil. Therefore, in the present invention, it is preferable that component (a), for example, PKS, is a granular material. Specifically, it is preferable that the plant growth promoter of the present invention contains a granular material of component (a), for example, PKS. Hereinafter, the granular material of component (a) may be referred to as granular component (a). Granular component (a) may contain lignin in the above range. Granular component (a) may be a pulverized product of component (a). Hereinafter, the PKS granular material may be referred to as a PKS granular material. The PKS granular material may contain lignin in the above range. The PKS granular material may be a pulverized product of PKS.

From the viewpoint of water resistance and growth promotion of the soil granulated material, the average particle size of granular component (a), for example, a PKS granular material, is preferably 1,000 μm or less, more preferably 600 μm or less, further preferably 500 μm or less, furthermore 350 μm or less, furthermore preferably 250 μm or less, and furthermore preferably 200 μm or less. From the viewpoint of the productivity of the granular material, this average particle size is preferably 0.1 μm or more, more preferably 1.0 μm or more, further preferably 10 μm or more. From the viewpoint of the handleability of the granular material, this average particle size is further preferably 40 μm or more, and further preferably 80 μm or more. The average particle size of granular component (a), for example, a PKS granular material, is measured using a laser diffraction/scattering particle size distribution analyzer "LA-950" (manufactured by Horiba, Ltd.).

Granular component (a), for example, a PKS granular material, can be obtained by pulverizing a palm shell by a known pulverizing means such as a pulverizer. The pulverizer used for pulverizing component (a), such as PKS, is not particularly limited, and is, for example, a roll mill such as a high-pressure compression roll mill and a roll rotation mill, a vertical roller mill such as a ring roller mill, a roller race mill, and a ball race mill, a vessel driving medium mill such as a rolling ball mill, a vibration ball mill, a vibration rod mill, a vibration tube mill, a planetary ball mill, and a centrifugal fluidization mill; a medium stirring mill such as a tower mill, a stirring tank mill, a circulation tank mill, and an annular mill; a consolidation shear mill such as high speed centrifugal roller mill and an angmill; a mortar; a stone mill; a masscolloider; a fret mill; an edge runner mill; a knife mill; a pin mill; and a cutter mil.

Among these, from the viewpoint of pulverization efficiency and productivity of component (a), for example, PKS, a vessel driving medium mill or a medium stirring mill is preferable, a vessel driving medium mill is more preferable, a vibration mill such as a vibration ball mill, a vibration rod mill or a vibration tube mill is further preferable, and a vibration rod mill is further preferable.

The pulverization method may be either of a batch type and a continuation type.

Examples of the material of the device and/or the medium used for the pulverization include, but are not particularly limited to, iron, stainless steel, alumina, zirconia, silicon carbide, silicon nitride, and glass. However, from the viewpoint of pulverization efficiency of the cellulose-containing raw material, iron, stainless steel, zirconia, silicon carbide, and silicon nitride are preferable, and from the viewpoint of industrial use, iron or stainless steel is more preferable.

From the viewpoint the pulverization efficiency of component (a), for example, PKS, it is preferable that the device to be used is a vibration mill and that the media are rods or balls.

When the media are rods, from the viewpoint of efficient pulverization, the outer diameter of the rods is preferably 5 mm or more, more preferably 10 mm or more, and further preferably 20 mm or more, and from the same viewpoint, is preferably 100 mm or less, more preferably 50 mm or less, and further preferably 40 mm or less.

When the media are balls, from the viewpoint of efficient pulverization, the outer diameter of the balls is preferably 0.1 mm or more and more preferably 1 mm or more, and from the same viewpoint, is preferably 100 mm or less and more preferably 50 mm or less.

Although the filling factor of the media has a different suitable range depending on the model of a vibration mill, from the viewpoint of efficient pulverization, the filling factor is preferably 10% by volume or more, more preferably 30% by volume or more, and further preferably 50% by volume or more, and preferably 95% by volume or less, more preferably 90% by volume or less, and further preferably 70% by volume or less. Herein, the filling factor means the volume of media relative to the volume of a vessel in the stirring part of a vibration mill.

Although the pulverization time depends on the pulverizer that is used and the amount of energy that is consumed, from the viewpoint of miniaturization of the plant biomass, it is usually 1 minute or more, and preferably 3 minutes or more, and from the viewpoint of miniaturization of the plant biomass and the viewpoint of economic efficiency, it is usually 12 hours or less, preferably 3 hours or less, more preferably 1 hour or less, and further preferably 12 minutes or less.

Further, from the viewpoint of improving the pulverization efficiency and improving production efficiency (shortening production time) of component (a), for example, PKS, component (a), for example, PKS, can be subjected to a pulverization treatment in the presence of a basic compound. After this treatment, it is preferably neutralized by use of an acid.

Examples of the basic compound used in the pulverization treatment include alkali metal hydroxides such as sodium hydroxide, potassium hydroxide, and lithium hydroxide; alkaline earth metal hydroxides such as magnesium hydroxide and calcium hydroxide; alkali metal oxides such as sodium oxide and potassium oxide; alkaline earth metal oxides such as magnesium oxide and calcium oxide; alkaline metal sulfides such as sodium sulfide and potassium sulfide; alkaline earth metal sulfides such as magnesium sulfide and calcium sulfide; and quaternary ammonium hydroxides such as tetramethylammonium hydroxide and tetrabutylammonium hydroxide. Among these, from the viewpoint of improving the enzyme saccharification rate, the basic compound is preferably an alkali metal hydroxide or an alkaline earth metal hydroxide, more preferably an alkali metal hydroxide, and further preferably sodium hydroxide or potassium hydroxide. These basic compounds can be used singly or in combination of two or more.

The amount of the basic compound used in the pulverization treatment is, when all the holocellulose in component (a), for example, PKS, is assumed to be cellulose, per 1 mol of the anhydroglucose units (hereinafter sometimes referred to as "AGU") that constitute the cellulose, preferably 0.01-fold mol or more, more preferably 0.05-fold mol or more, and further preferably 0.1-fold mol or more, and from the viewpoint of the ease of neutralization and/or washing of the basic compound and the viewpoint of the cost of the basic compound, preferably 10-fold mol or less, more preferably 8-fold mol or less, further preferably 5-fold mol or less, and further preferably 1.5-fold mol or less.

The water content during the pulverization is, relative to the dry mass of component (a), for example, PKS, preferably 0.1% by mass or more, more preferably 0.5% by mass or more, further preferably 1% by mass or more, and further preferably 2% by mass or more, and preferably 40% by mass or less, more preferably 30% by mass or less, and further preferably 20% by mass or less.

The water content during the pulverization means the amount of water relative to the dry mass of component (a), for example, PKS, and can be appropriately adjusted by, for example, reducing the amount of water included in component (a), for example, PKS, and the basic compound by a drying treatment or the like; or by increasing the amount of water by adding water during the pulverization.

The average particle size of granular component (a), for example, a PKS granular material, obtained after pulverization treatment is preferably 1,000 µm or less, more preferably 600 µm or less, and further preferably 350 µm or less, and preferably 0.1 µm or more, more preferably 1.0 µm, and further preferably 10 µm or more.

The present invention provides a method for producing a plant growth promoter containing granular component (a), for example, a PKS granular material, the method including pulverizing component (a), for example, PKS, to obtain a granular material. The pulverization of component (a), for example, PKS can be carried out in the manner described above. Further, the average particle size of the granular material can be set to the range described above.

It is preferable that component (a), for example, PKS, and further, granular component (a), for example, a PKS granular material, have been subjected to a water treatment.

The water treatment is carried out by bringing a medium including water (hereinafter referred to as an aqueous medium) into contact with component (a), for example, PKS. More specifically, the water treatment is a water contact treatment. The aqueous medium is water or a medium including water. The pH of the aqueous medium is preferably 6 or more and 9 or less, and more preferably 6 or more and 8 or less. The temperature of the aqueous medium is preferably 25° C. or higher and more preferably 35° C. or higher, and preferably 60° C. or lower and more preferably 45° C. or lower. The contact time between component (a), for example, PKS, and the aqueous medium is preferably 1 hour or more and 48 hours or less. The amount of the aqueous medium is preferably 200 parts by mass or more and 2,000 parts by mass or less with respect to 100 parts by mass of component (a), for example, PKS.

The following method is an example of the water treatment. A dispersion is obtained by mixing 100 parts by mass of granular component (a), for example, a PKS granular material, and 200 to 2,000 parts by mass of water, for example, ion exchange water, of 35° C. to 45° C. While maintaining the temperature of the dispersion, the dispersion is left to stand, or preferably stirred, for 1 to 48 hours. After the standing or stirring, the aqueous medium is removed by filtration or the like to obtain a solid residue, and the solid residue is preferably dried to obtain a water-treated component (a), for example, a granular material of PKS.

The water treatment may include mixing component (a), for example, PKS, and an aqueous medium, and separating component (a), for example, PKS, from the aqueous medium after mixing.

The present invention provides a method for producing a plant growth promoter having a water treatment step of treating component (a), for example, PKS, with a medium containing water. The pH of the aqueous medium, the temperature of the aqueous medium, and the contact time between component (a), for example, PKS, and the aqueous medium are as described above. This production method preferably has a separation step of separating component (a), for example, PKS, from the aqueous medium after the water treatment step.

In the plant growth promoter of the present invention, component (a), for example, PKS, may be a water-treated product. Specifically, an example of the plant growth promoter of the present invention is a plant growth promoter containing a water-treated product of component (a), for example, PKS. The water-treated product of component (a), for example, PKS, is obtained as a residue after treating component (a), for example, PKS, with an aqueous medium as described above.

Further, component (a), for example, PKS, and further, granular component (a), for example, a PKS granular material, may be components that have been subjected to a treatment such as hydrophilization. The hydrophilized granular material of component (a), for example, PKS, can be obtained by subjecting granular component (a), for example, a PKS granular material, to a hydrophilic treatment, specifically, an alkali treatment, a hot water treatment (treatment carried out at a higher temperature than the above water treatment), an acid treatment, a solvent treatment, or a combination of these. For example, examples of the plant growth promoter of the present invention include a plant growth promoter containing a hydrophilized granular material of palm kernel shell.

From the viewpoint of promoting growth, component (a), for example, PKS, and further, granular component (a), for example, a PKS granular material, have a contact angle with water (hereinafter sometimes referred to as water contact angle), of preferably 50° or less, more preferably 45° or less, further preferably 40° or less, furthermore preferably 35° or less, furthermore preferably 30° or less, and furthermore preferably 25° or less, and preferably 0° or more. Here, the water contact angle of component (a), for example, PKS, is measured under the following conditions.

[Measurement Method of Water Contact Angle of Component (a), for Example, PKS]

0.1 to 0.3 g of component (a), for example, PKS, to be measured is sampled and pressure is applied so that the density is 1.3 to 1.7 g/cm$^3$ to obtain a compressed product as a sample having a flat surface, for example, a compressed product having a shape such as a cylinder, a cube, or a rectangular parallelepiped. Note that component (a), for example, PKS, to be measured may be formed into granules by pulverizing as appropriate. When the particles of the granulated material are large or irregular in shape and the like, the particles may be pulverized to obtain a powder having an adjusted particle size and shape, and this powder may be used as the sample as a compressed product in the same manner as described above. Further, the powder of the granular component (a), for example, the PKS granular material, may be finely divided by compression.

The sample, for example, a compressed product of granular component (a), and further a PKS granular material, is placed so that its flat surface is horizontal. Pure water of 20° C. and with a droplet size of 5 µm is dropped onto the flat surface, and the contact angle after 1 second is measured. The contact angle is calculated by finding the angle of the straight line connecting the left and right end points and the vertex of the droplet to the solid surface and doubling this (θ/2 method). The measurement is performed 3 times per sample, and the value obtained as the average value thereof is adopted as the contact angle with water.

The plant growth promoter of the present invention is preferably a granular material. The particles of the granular material may be in any form that can be easily formed from a component including component (a), such as a powder and a pellet.

The plant growth promoter of the present invention has an average particle size of preferably 1,000 µm or less, more preferably 600 µm or less, and further preferably 350 µm or less, and preferably 0.1 µm or more, more preferably 1.0 µm or more, and further preferably 10 µm or more. The average particle size of the plant growth promoter of the present invention is measured using a laser diffraction/scattering particle size distribution analyzer "LA-950" (manufactured by Horiba, Ltd.).

The plant growth promoter of the present invention preferably contains 10% by mass or more and more preferably 20% by mass or more, and preferably 100% by mass or less, of component (a), for example, PKS. The plant growth promoter of the present invention may be composed of component (a), for example, PKS, and further, may be composed of granular component (a), for example, a PKS granular material. Further, the plant growth promoter of the present invention can contain components other than component (a), for example, PKS.

The plant growth promoter can contain, as optional components, for example:

(1) a fertilizer component;

(2) a mineral powder, a clay component, or other soil-improving component such as zeolite, vermiculite, bentonite, soft silica (silicate terra alba), perlite, peat moss, or bark compost;

(3) a polymer substance such as polyethyleneimine, polyvinyl alcohol, or polyacrylic acid;

(4) a signal molecule such as chitooligosaccharide, a chitinous compound, or flavonoid such as isoflavone or rutin;

(5) a fungus such as an arbuscular mycorrhizal fungus;

(6) a bacterium such as *Bacillus* sp., *Pseudomonas* sp., *Azospirillum* sp., *Paenibacillus* sp., *Burkholderia* sp., *Serratia* sp., *Enterobacter* sp., *Brevibacterium* sp., *Curtobacterium* sp., or a legume symbiotic root nodule bacterium; and (7) soyasaponin.

Among the above components, examples of the arbuscular mycorrhizal fungus of (5) include fungi belonging to the *Gigaspora* sp. and the *Glomus* sp. Among these, examples of *Glomus* sp. include *Glomus intraradices*.

Among the above components, examples of the *Bacillus* sp. of (6) include *Bacillus amyloliquefaciens, Bacillus licheniformis, Bacillus subtilis,* and *Bacillus thuringiensis*. Examples of *Pseudomonas* sp. include *Pseudomonas putida*, and *Pseudomonas fluorescens*. Examples of *Azospirillum* sp. include *Azospirillum brasilense, Azospirillum lipoferum, Azospirillum halopraeferans,* and *Azospirillum amazonense*. Examples of *Paenibacillus* sp. include *Paenibacillus polymyxa* and *Paenibacillus macerans*. Examples of *Burkholderia* sp. include *Burkholderia gladioli*. Examples of *Serratia* sp. include *Serratia marcescens*. Examples of *Enterobacter* sp. include *Enterobacter cloacae*. Examples of *Brevibacterium* sp. include *Brevibacterium iodinum* and *Brevibacterium brevis*. Examples of *Curtobacterium* sp. include *Curtobacterium flaccumfaciens*. Examples of the legume symbiotic root nodule bacterium include bacteria belonging to the *Rhizobium* Genus, the *Bradyrhizobium* Genus, and *Azorhizobium* Genus. Examples of *Bradyrhizobium* sp. include *Bradyrhizobium diazoefficiens, Bradyrhizobium japonicum, Bradyrhizobium elkanii,* and *Ensifer fredii*.

Among the above components, examples of (7) soyasaponin include the examples described in paragraph [0028] of WO-A 2018/159393.

The plant growth promoter of the present invention can contain 1% by mass or more and 50% by mass or less of (1) a fertilizer component.

The plant growth promoter of the present invention can contain 1% by mass or more and 50% by mass or less of (2) a mineral powder, a clay component, or other soil-improving component; or (3) a polymer substance, respectively.

The plant growth promoter of the present invention can contain $2.5 \times 10^{-13}$% by mass or more and $2.5 \times 10^{-11}$% by mass or less of (4) a signal molecule.

The plant growth promoter of the present invention can contain $10^2$ cfu (colony forming units) or more and $10^7$ cfu or less of (5) a fungus and/or (6) a bacterium per 1 g of component (a), for example, PKS, respectively. Here, in the case of a fungus, the colony forming unit means the number of spores.

The plant growth promoter of the present invention can contain (7) soyasaponin so as to be used in the amount described in paragraph [0040] of WO-A 2018/159393, for example.

It is expected that the activity and the amount of adhesion of useful microorganisms, for example, plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; and legume symbiotic root nodule bacteria, that exist in the soil will be able to be improved by adding the plant growth promoter of the present invention to soil. It is expected similarly that the activity and the amount of adhesion of plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; or legume symbiotic root nodule bacteria that the plant growth promoter composition of the present invention contains will be able to be improved.

From the viewpoint of adhesion of component (a), for example, PKS, to the action site and the viewpoint of an increase in the permeation amount, the plant growth promoter of the present invention can contain a surfactant. Examples of the surfactant include one or more surfactants selected from nonionic surfactants, anionic surfactants, cationic surfactants, and amphoteric surfactants. As the surfactant, a nonionic surfactant is preferable.

In the case that the plant growth promoter of the present invention contains a surfactant, the surfactant is, with respect to 100 parts by mass of component (a), for example, PKS, preferably 1 part by mass or more, more preferably 10 parts by mass or more, and further preferably 50 parts by mass or more, and preferably 1,900 parts by mass or less, more preferably 600 parts by mass or less, and further preferably 400 parts by mass or less.

From the viewpoint of increasing the amount of component (a), for example, PKS, attached to the action site, the plant growth promoter of the present invention can contain a water-soluble polymer. Herein, the "water soluble" in regard to the water-soluble polymer refers to dissolving 1 g or more in 100 g of water at 20° C. Any of natural, semisynthetic, and synthetic polymers can be used as the water-soluble polymer. Among them, a water-soluble polysaccharide polymer is preferable. Specific examples of the water-soluble polysaccharide polymer include guar gum, xanthan gum, starch, cellulose, tara gum, locust bean gum, carrageenan, and their derivatives. When the plant growth promoter of the present invention contains a water-soluble polymer, the water-soluble polymer is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less, with respect to 100 parts by mass of component (a), for example, PKS.

The plant growth promoter of the present invention can contain, for example, a fertilizer component in addition to these. Specifically, a fertilizer component available under a trade name such as HYPONICA (Kyowa Co., Ltd.) or HYPONEX can be contained in an amount of 1 part by mass or more and 1,900 parts by mass or less with respect to 100 parts by mass of component (a), for example, PKS.

The plant growth promoter of the present invention is usually in the form of particles including component (a), for example, PKS, and preferably granular component (a), for example, a PKS granular material, but may also be in the form of a molded product of granular component (a), for example, a PKS granular material, a complex product of granular component (a), for example, a PKS granular material, and another product, and the like.

The plant growth promoter of the present invention is preferably used by adding it to soil. Specifically, the plant growth promoter of the present invention is preferably a soil addition type plant growth promoter. Application of the plant growth promoter of the present invention to a plant, for example, an agricultural crop, can be carried out in soil containing the plant growth promoter of the present invention to cultivate the plant, for example, the agricultural crop.

The plant to which the present invention can be applied is preferably a plant used as an agricultural crop. The plant growth promoter of the present invention can be used as a plant yield enhancer, and further as a crop yield enhancer. Examples of the plants to which the plant growth promoter of the present invention can be applied include Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae. Specifically, examples of fruit and vegetables include cucumbers, pumpkins, watermelons, melons, tomatoes, eggplants, bell peppers, strawberries, okra, green beans, broad beans, peas, green soybeans, and corn. Examples of leaf vegetables include Chinese cabbages, pickled greens, Ching Guang Juai, cabbages, cauliflowers, broccolis, brussels sprouts, onions, welsh onions, garlics, rakkyos, Chinese chives, asparaguses, lettuces, butter lettuces, celeries, spinaches, garland chrysanthemums, parsleys, mitsubas, ciceliies, udo salad plants, myoga gingers, sweet coltsfoot, and Japanese basils. Examples of root vegetables include daikon radishes, turnips, burdocks, carrots, potatoes, eddoes, sweet potatoes, yams, gingers, and lotuses. In addition, the plant growth promoter of the present invention may be used for rice, wheat varieties, flowers, and the like, and is preferably applied to cereals such as beans such as soybeans and green soybeans, which tend to be cultivated on a large scale.

<Method for Growing a Plant>

The present invention provides a method for growing a plant, wherein the plant is cultivated in a soil containing the plant growth promoter of the present invention. More specifically, the present invention provides a method for growing a plant, wherein the plant is cultivated in a soil containing component (a), for example, PKS. Preferred embodiments of component (a), for example, PKS, to be used in the method for growing a plant of the present invention are the same for as the plant growth promoter of the present invention. Plants to which the method for growing the plant of the present invention can be applied are the same as those of the plant growth promoter of the present invention. Further, it is preferable that the method for growing the plant of the present invention is a method for growing an agricultural crop or a method for cultivating an agricultural crop.

In the method for growing a plant of the present invention, the application time and the number of applications of component (a), for example, PKS, are not particularly limited. Component (a), for example, PKS, may also be applied by adding to the soil and the like before sowing. Component (a), for example, PKS, may be appropriately applied in accordance with the level of plant growth in any period from the start of cultivation, such as sowing and planting, to the end of cultivation, such as harvesting.

Further, in the method for growing the plant of the present invention, component (a), for example, PKS, is applied to the plant by adding it to the soil in which the plant is to be cultivated. The timing for adding to the soil is preferably before sowing.

In the present invention, the addition of component (a), for example, PKS, of the present invention to the soil can be carried out by mixing granular component (a), for example, a PKS granular material, into the soil, spraying granular component (a), for example, a PKS granular material, onto the soil, and the like.

Examples of the specific method of adding component (a), for example, PKS, to the soil in a field include a method of plowing while spraying component (a), for example, a PKS granular material, by using a spreading machine in combination with a cultivator.

In the present invention, the plant growth promoter of the present invention, further, component (a), for example, PKS, is added in an amount of preferably 0.0001 parts by mass or more, more preferably 0.001 parts by mass or more, and further preferably 0.01 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less per 100 parts by mass of the soil for cultivating the plant. In other words, in the present invention, the plant is cultivated in a soil containing the plant growth promoter of the present invention, further, component (a), for example, PKS, in an amount of preferably 0.0001 parts by mass or more, more preferably 0.01 parts by mass or more, and further preferably 0.05 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less.

When the plant growth promoter of the present invention is added using the plant growth method of the present invention to the soil by, for example, spraying, the plant growth promoter of the present invention, further, component (a), for example, PKS, is added in an amount of preferably 0.2 kg or more, more preferably 2 kg or more, and further preferably 20 kg or more, and preferably 20,000 kg or less, more preferably 5,000 kg or less, further preferably 2,000 kg or less, furthermore preferably 1,000 kg or less, and furthermore preferably 500 kg or less per 10a of soil. Even when spraying the plant growth promoter of the present invention, further, component (a), for example, PKS, the amount added per 100 parts by mass of soil may be within the above range.

Other Modes of Present Invention

The present invention relates to a soil aggregating agent containing one or more seed shell components of plant selected from Palmae Elaeis, Leguminosae Faboideae, Juglandaceae, Rosaceae Prunus, and Oleeae (hereinafter referred to as component (a)).

Further, the present invention relates to a soil aggregating method including mixing a soil aggregating agent containing one or more components selected from component (a) with soil.

In addition, the present invention relates to a method for producing a soil granulated material, the method including mixing a soil aggregating agent containing one or more components selected from component (a) with soil.

In the soil aggregating agent, the soil aggregating method, and the method for producing a soil granulated material of the present invention, the one or more components selected from component (a) are component (a) as described above.

In the soil aggregating agent, the soil aggregating method, and the method for producing a soil granulated material of the present invention, specific examples and preferred embodiments of component (a) are the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to the soil aggregating agent, the soil aggregating method, and the method for producing a soil granulated material of the present invention.

The present invention relates to use, as a plant growth promoter, of one or more seed shell components of plant selected from Palmae Elaeis, Leguminosae Faboideae, Juglandaceae, Rosaceae Prunus, and Oleeae (hereinafter referred to as component (a)).

Further, the present invention relates to use, for promoting plant growth, of one or more components selected from component (a).

In addition, the present invention relates to use, as a soil aggregating agent, of one or more components selected from component (a).

Furthermore, the present invention relates to use, for aggregating soil, of one or more components selected from component (a).

In these uses, the one or more components selected from component (a) are component (a) as described above. In these uses of the present invention, specific examples and preferred embodiments of component (a) are the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to these uses of the present invention.

EXAMPLES

The plant growth promoter of the present invention was produced as follows.

Production Example 1

Palm kernel shell (PKS) (palm kernel shell, Shodensya Co., Ltd.) (water content 2.3%, lignin content 48.8% by mass) was placed into a mini-speed mill "MS-05" (manufactured by Labonect Co., Ltd.) and pulverized for 20 seconds 5 times. The obtained pulverized material was sieved, passed through a 500 μm diameter mold sieve, and the material that remained on the 355 μm diameter mold sieve was taken as inventive product 1 of the plant growth promoter. The average particle size and water contact angle of inventive product 1 were measured by the methods described above. The results are shown in Table 1.

Production Example 2

Inventive product 2a of the plant growth promoter was produced in the same manner as in Production Example 1, except for passing the pulverized material through the 355 μm diameter mold sieve and taking the matter that remained on a 100 μm diameter mold sieve.

Further, inventive product 2b of the plant growth promoter was produced in the same manner as in Production Example 1, except for passing the pulverized material through the 355 μm diameter mold sieve and taking the matter that remained on a 75 μm diameter mold sieve.

In addition, inventive product 2c of the plant growth promoter was produced in the same manner as in Production Example 1, except for passing the pulverized material through a 150 μm diameter mold sieve and taking the matter that remained on a 75 μm diameter mold sieve.

Still further, inventive product 2d of the plant growth promoter was produced in the same manner as in Production Example 1, except for taking the matter that had been passed through a 75 μm diameter mold sieve.

The average particle size and water contact angle of inventive products 2a, 2b, 2c, and 2d were measured by the methods described above. The results are shown in Table 1.

Production Example 3

A water treatment was performed on inventive product 2a obtained in Production Example 2. 100 parts by mass of inventive product 2a and 900 parts by mass of ion exchange water were mixed in a glass bottle to obtain a slurry. The obtained slurry was stirred with a stirrer at 40° C. for 24 hours, and then subjected to suction filtration with a G4 glass filter, and further washed with 2,000 parts by mass of ion exchange water to obtain a residue. The obtained residue was vacuum-dried at 25° C. to obtain a granular material having a water content of 1.4% by mass, which was taken as inventive product 3 of the present invention. The average particle size and water contact angle of inventive product 3 were measured by the methods described above. The results are shown in Table 1.

Production Examples 4 to 10

Inventive products 4 to 10 of the plant growth promoter were produced in the same manner as in Production Example 1 for peach seed shell, prune seed shell, olive seed shell, Japanese apricot seed shell, peanut seed shell, walnut seed shell, and Japanese plum seed shell as well, except that the seed shells collected from each of those fruits were passed through a 150 μm diameter mold sieve, and the material that remained on a 75 μm diameter mold sieve was taken as the inventive product. The average particle size and water contact angle of inventive products 4 to 10 were measured by the methods described above. The results are shown in Table 1.

Comparative plant growth promoters 1 and 2 were produced as follows.

Comparative Production Example 1

Comparative plant growth promoters 1 and 2 were produced in the same manner as Production Example 1, except that the raw materials were changed as shown in Table 1. The average particle size and water contact angle of comparative products 1 and 2 were measured by the methods described above. The results are shown in Table 1.

<Evaluation>

(1) Water Resistance Evaluation of Soil Granulated Material

The water resistance of a mixed granulated material obtained by mixing the plant growth promoter shown in Table 1 and soil was evaluated.

As the soil, a sample of soil (alluvial soil) from Saga Prefecture that had been passed through a sieve having 2 mm openings to remove coarse particles, stones, and gravel was used.

The soil was placed in a 100 mL polycup, and the plant growth promoter shown in Table 1 was added so as to have the amount added shown in Table 1 with respect to 100 parts by mass of the soil. Further, water was added so as to be 30% by mass with respect to the soil, and after manually stirring for about 3 minutes, soil granulated material having a diameter of 1 to 3 mm was taken as a sample from the material obtained. The obtained soil granulated sample was placed in a disposable glass test tube (13 mm×100 mm, manufactured by IWAKI) filled with water to a height of 5 cm, and the time until the soil granulated material broke down was measured. Each test was repeated 5 times, and the average value is shown in Table 1. In addition, the amount added in the table is represented as parts by mass with respect to 100 parts by mass of soil (the same applies hereinafter).

(2) Soybean Growth Test

The growth promotion effect on soybeans when the plant growth promoters shown in Table 2 were added to the soil and applied to soybeans was evaluated.

As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63 L, "SS100-63" (Shinsei Co., Ltd.)), and a plant growth promoter shown in Table 2 was added so as to be 0.1 parts by mass with respect to 100 parts by mass of soil. Further, water was added so as to be 20 mass % with respect to the soil, and after stirring for about 5 minutes, the obtained mixture was taken as the soil sample. The soil sample was placed in a polyethylene pot for seedlings (diameter 12 cm), fertilized so that N/P/K=6 kg/6 kg/6 kg per 10 a, and soybeans grown separately until the cotyledon development stage (varieties: Fukuyutaka, IWAKURA SEED Co.) were replanted in the pot. About 3 weeks after the replanting, the soybean seedlings were taken out and washed with water, and the dry mass of the part below the ground was measured. The number of repetitions was 8, and the average value thereof was obtained. Each average value is shown in Table 2 as a relative value based on a control value of 100. The control was performed without using the plant growth promoter (Comparative Example 2-1 in Table 2). A large relative value in Table 2 means that viability until harvest is good, and an increase in crop yield is expected.

(3) Measurement of Soil Hardness

As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63 L, "SS100-63" (Shinsei Co., Ltd.)), and a plant growth promoter shown in Table 2 was added so as to be 0.1 parts by mass with respect to 100 parts by mass of soil. Further, water was added so as to be 20 mass % with respect to the soil, and after stirring for about 5 minutes, the obtained mixture was taken as the soil sample.

A soil sample (900 g) was placed in a polyethylene pot for seedlings (diameter 12 cm). The pot was left outdoors, and 500 L/a of water was sprayed using natural water and a garden master sprayer (manufactured by KOSHIN) every two days. After 3 weeks, the hardness of the soil sample was measured. The hardness of the soil sample was measured using a Yamanaka-type soil hardness tester (Fujiwara Scientific Co., Ltd: standard soil hardness tester No. 351).

In accordance with the instruction manual of the soil hardness tester, the tip cone of the soil hardness tester was inserted until the surface of the soil sample contacted the brim, and then slowly pulled out. The reading of the scale (mm) at that time was read and calculated as a load bearing strength (kg/cm$^2$) by the following formula. Table 2 shows the average value of 5 repetitions with the load bearing strength as soil hardness.

$$P = [100X]/[0.7952(40-X)^2]$$

P: Load bearing strength (kg/cm$^2$)
X: Reading (mm)

TABLE 1

| | | | plant growth promoter | | | | soil |
| | | | raw material | | average | contact | | granulated |
| | | symbol | type | lignin content (% by mass) | particle size (μm) | angle with water (°) | amount added (parts by mass) | material water resistance (seconds) |
|---|---|---|---|---|---|---|---|---|
| Comparative Examples | 1-1 | comparative product 1 | coconut coir dust | 50.4 | 511 | 63.5 | 0.1 | 71 |
| | 1-2 | comparative product 2 | coconut shell | 36.6 | 528 | 0.0 | 0.1 | 63 |
| Examples | 1-1 | inventive product 1 | PKS | 48.8 | 530 | 24.4 | 0.1 | 101 |
| | 1-2 | inventive product 2a | PKS | 48.8 | 277 | 24.4 | 0.1 | 120 |
| | 1-3 | inventive product 2b | PKS | 48.8 | 212 | 24.4 | 0.1 | 141 |
| | 1-4 | inventive product 2c | PKS | 48.8 | 144 | 24.4 | 0.1 | 196 |
| | 1-5 | inventive product 2d | PKS | 48.8 | 42 | 24.4 | 0.1 | 248 |
| | 1-6 | inventive product 2a | PKS | 48.8 | 277 | 24.4 | 0.05 | 115 |
| | 1-7 | inventive product 3 | PKS | 53.1 | 256 | 0.0 | 0.1 | 262 |
| | 1-8 | inventive product 4 | peach seed shell | 45.8 | 120 | 34.5 | 0.1 | 104 |
| | 1-9 | inventive product 5 | prune seed shell | 45.4 | 144 | 29.4 | 0.1 | 133 |
| | 1-10 | inventive product 6 | olive seed shell | 34.5 | 131 | 47.7 | 0.1 | 127 |
| | 1-11 | inventive product 7 | Japanese apricot seed shell | 42.2 | 157 | 56.3 | 0.1 | 114 |
| | 1-12 | inventive product 8 | peanut seed shell | 42.0 | 168 | 77.3 | 0.1 | 140 |
| | 1-13 | inventive product 9 | walnut seed shell | 43.3 | 126 | 50.4 | 0.1 | 97 |
| | 1-14 | inventive product 10 | Japanese plum seed shell | 40.5 | 121 | 29.7 | 0.1 | 116 |

TABLE 2

| | | | plant growth promoter | | | | | |
| | | | raw material | | contact | average | | mass of | |
| | | symbol | type | lignin content (% by mass) | angle with water (°) | particle size (μm) | amount added (parts by mass) | soybean below ground (relative value) | soil hardness (kg/cm$^2$) |
|---|---|---|---|---|---|---|---|---|---|
| Comparative Examples | 2-1 | none | — | — | — | — | — | 100 | 1.25 |
| Examples | 2-1 | inventive product 2a | PKS | 48.8 | 24.4 | 277 | 0.1 | 115 | 0.48 |

The invention claimed is:

1. A soil aggregating agent, comprising:
   one or more seed shell components (a) of a plant selected from the group consisting of Palmae Elaeis, Leguminosae Faboideae, Juglandaceae, Rosaceae Prunus, and Oleeae,
   wherein the component (a) is a granular material having an average particle size of 150 μm or less and 0.1 μm or more.

2. The soil aggregating agent according to claim 1, wherein the component (a) is one or more components selected from the group consisting of palm kernel shell, peach seed shell, Japanese apricot seed shell, prune seed shell, peanut seed shell, walnut seed shell, Japanese plum seed shell, and olive seed shell.

3. The soil aggregating agent according to claim 1, wherein the component (a) is palm kernel shell.

4. The soil aggregating agent according to claim 1, wherein the granular material has an average particle size of 80 μm or more and 150 μm or less.

5. The soil aggregating agent according to claim 1, wherein the granular material has been subjected to a water treatment.

6. The soil aggregating agent according to claim 1, wherein the component (a) has a contact angle with water of 0° or more and 50° or less.

7. The soil aggregating agent according to claim 1, wherein the component (a) contains 40% by mass or more and 60% by mass or less of lignin.

8. The soil aggregating agent according to claim 5, wherein the water treatment is performed by bring an aqueous medium having a pH of 6 to 9 and a temperature of 25° C. to 60° C. into contact with the component (a) for a contact time of 1 hour to 48 hours.

9. The soil aggregating agent according to claim 1, wherein the granular material has been subjected to a hydrophilization treatment.

10. A method for growing a plant, the method comprising:
    cultivating the plant in a soil containing the soil aggregating agent according to claim 1.

11. The method according to claim 10, further comprising:
    aggregating the soil to obtain a soil granulated material.

12. The method according to claim 10, wherein the soil aggregating agent is added to the soil before sowing.

13. The method according to claim 10, wherein the soil aggregating agent is mixed into the soil or sprayed onto the soil.

14. The method according to claim 10, wherein the soil aggregating agent is added in an amount of 0.0001 parts by mass or more and 10 parts by mass or less per 100 parts by mass of the soil to the soil for cultivating the plant.

15. The method according to claim 10, wherein the soil aggregating agent is sprayed in an amount of 0.2 kg or more and 20,000 kg or less per 10a of the soil for cultivating the plant.

16. The method according to claim 10, wherein the plant is a plant used as an agricultural crop.

17. The method according to claim 10, wherein the plant is a plant selected from the group consisting of Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae.

18. The method according to claim 10, wherein the plant is a plant selected from the group consisting of a fruit and vegetable, a leaf vegetable, a root vegetable, rice, a wheat variety, and a flower.

19. A method for improving water resistance of a soil granulated material, the method comprising:
    aggregating a soil by introducing the soil aggregating agent according to claim 1 into the soil.

20. A method for reducing soil hardness, the method comprising:
    introducing the soil aggregating agent according to claim 1 into a soil.

* * * * *